US011009423B2

(12) United States Patent
Mordaunt et al.

(10) Patent No.: US 11,009,423 B2
(45) Date of Patent: May 18, 2021

(54) EXTERNAL LEAK DETECTION SYSTEM TO DETECT A LEAK IN A CONDUIT

(71) Applicant: The Boeing Company, Chicago, IL (US)

(72) Inventors: Kane Mordaunt, Bellevue, WA (US); Mark Douglas Fuller, Snohomish, WA (US); David Keith Farnsworth, Mount Vernon, WA (US); Andrew Perry Newton, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 252 days.

(21) Appl. No.: 16/101,875

(22) Filed: Aug. 13, 2018

(65) Prior Publication Data

US 2020/0049585 A1   Feb. 13, 2020

(51) Int. Cl.
*G01M 3/28* (2006.01)
(52) U.S. Cl.
CPC .................. *G01M 3/2807* (2013.01)
(58) Field of Classification Search
CPC ............. G01M 3/2807; G01M 3/2861; G01M 3/2815; F17D 5/02
See application file for complete search history.

(56) References Cited

U.S. PATENT DOCUMENTS

| | | | |
|---|---|---|---|
| 10,309,818 B2* | 6/2019 | Gagne | G01F 15/005 |
| 2005/0199073 A1* | 9/2005 | Keech | G01F 1/588 |
| | | | 73/861.12 |
| 2012/0318069 A1* | 12/2012 | Murakami | G01F 1/667 |
| | | | 73/861.18 |
| 2014/0166149 A1 | 6/2014 | Hemstock | |
| 2015/0346049 A1* | 12/2015 | Schwind | G01M 3/2815 |
| | | | 73/40.7 |

FOREIGN PATENT DOCUMENTS

| | | |
|---|---|---|
| WO | 9516195 A1 | 6/1995 |
| WO | 2015169569 A1 | 11/2015 |

OTHER PUBLICATIONS

EP Search Report dated Mar. 10, 2020 in re EP Application No. 19191215.3.
Uson LP, "Qualitek 626 Differential Pressure Decay Leak Tester," Specification for Model Qualitek 626, Air pressure decay for the manufacturing industry, Houston, TX, http://4a8bba3b57s011ohne1hht0puh0.wpengine.netdna-cdn.com/wp-content/uploads/2012/10/626-Differential-Pressure-Decay-Leak-Tester.pdf, downloaded from internet, downloaded from internet Aug. 1, 2015, pp. 1-2.

(Continued)

*Primary Examiner* — Suman K Nath
(74) *Attorney, Agent, or Firm* — Coats & Bennett, PLLC

(57) ABSTRACT

A leak detection system configured to be attached on an exterior of a conduit to detect a leak in a non-pressurized conduit. The leak detection system includes a first fluid section and a second fluid section that each includes the same or similar fluid volumes. The first fluid section includes a testing chamber configured be attached to the conduit. With the testing chamber positioned on the conduit, a pressure sensor connected to each of the first and second fluid sections senses a difference in the fluid pressure between the first and second fluid sections to detect a leak.

20 Claims, 9 Drawing Sheets

(56) References Cited

OTHER PUBLICATIONS

Cincinnati Test Systems, "Sentinel Blackbelt Precision Leak Test Instrument," Jan. 1, 2009, pp. 1-4, Brochure, available at: https://www.cincinnati-test.com/documents/Sentinel%20Blackbelt.pdf.

Vacuum Instrument Corporation LLC, "VIC Leak Detection Air Leak Testing: 2100 Series, Mass Flow Leak Detectors," Jan. 1, 2003, Ronkonkoma, NY, pp. 1-4, Brochure, available at: www.vicleakdetection.com/wp-content/uploads/2014/09/AT-2100.pdf.

Vacuum Instrument Corporation LLC, "VIC-Torr—Mass Flow, Pressure Decay or Vacuum Decay," Jan. 1, 2016, Ronkonkoma, NY, pp. 1-2, available at: https://www.vicleakdetection.com/product/34/VICTORR.

\* cited by examiner

EXTERNAL LEAK DETECTION SYSTEM TO DETECT A LEAK IN A CONDUIT

TECHNOLOGICAL FIELD

The present disclosure is directed to a leak detection system and, more specifically, to a leak detection system that attaches to an exterior of a conduit to provide accurate and fast leak detection results.

BACKGROUND

There are numerous different types of testing methods to detect for leaks in a conduit such as pipe fittings and single pipes. An operating fluid leak check pressurizes the conduit with operating fluid and visually checks for leaks and pressure loss. A pressure decay leak test pressurizes the conduit with a gas such as air and measures the loss of pressure over time. A tracer gas/sniffing leak test pressurizes the conduit with a gas such as helium and uses a helium sniffing device at fittings to detect leakage. A bubble leak test pressurizes the conduit with a gas such as air and uses a bubble leak detection solution at the joints to detect leakage. An ultrasonic leak test pressurizes the conduit with a gas such as air and uses an ultrasonic leak detector to detect leakage.

These methods include a variety of drawbacks. Some tests are not sensitive unless a long period of time (hours or days) is allotted to observe leakage. This is often times not practical when the conduit system is needed for on-going basis, such as in a production environment. For some tests, maximum test accuracy requires that ambient temperature and pressure be measured and accounted for in the calculations which can be confusing and time consuming. Some tests can detect a leak, but require a second test to determine the location of the leak. Some tests require relatively expensive equipment and training. Some tests are not able to detect relative large or relatively small leaks

SUMMARY

One aspect is directed to a leak detection system to test a non-pressurized conduit. The leak detection system includes a first fluid line and a second fluid line connected to the first fluid line. A testing chamber is connected to the first fluid line and is sized to extend around the conduit. Valves are connected to the first fluid line and the second fluid line. The valves are adjustable between open and closed positions to control fluid entering and exiting the first fluid line and the second fluid line and to control a flow of fluid between the first and second fluid lines. A pressure sensor is connected to each of the first and second fluid lines to sense a difference in fluid pressure between the first fluid line and the second fluid line.

In one aspect, a first fluid volume of the first fluid line and the testing chamber is within 15 cc of a second fluid volume of the second fluid line.

In one aspect, the system includes a reference chamber connected to the second fluid line with a first fluid volume of the first fluid line and the testing chamber being within 15 cc of a second fluid volume of the second fluid line and the reference chamber.

In one aspect, the testing chamber is formed by a first member and a separate second member that are configured to be connected together and with at least one of the first member and the second member including a seal for the testing chamber to be airtight when the first and second members are in a closed position.

In one aspect, each of the first and second members includes a concave channel that extends into the inner face and a concave chamber section positioned along the channel and extending a greater distance into the inner face with the channels of the first and second members being aligned together in the closed position.

In one aspect, the system includes a seal that extends around the testing chamber to prevent fluid from leaking from the testing chamber with the seal including an inner seal positioned in closer proximity to the conduit and an outer seal positioned farther away from the conduit and with the inner and outer seals being spaced apart by a gap.

In one aspect, the first fluid line includes a first branch line that extends into the testing chamber and a second branch line that extends into the gap formed between the inner and outer seals.

In one aspect, the system includes a selection valve positioned on the first fluid line with the selection valve being adjustable between a first position for fluid to flow along the first branch line and prevent fluid to flow along the second branch line and with a second position for fluid to flow along the second branch line and prevent fluid to flow along the first branch line.

In one aspect, one of the valves is positioned on one of the first fluid lines and the second fluid lines, and a second one of the valves is positioned on a feeder line that leads to each of the first fluid line and the second fluid line.

One aspect is directed to a leak detection system to test a non-pressurized conduit. The leak detection system includes a first fluid section with a first fluid line, an attachment member with a testing chamber connected to the first fluid line with the attachment member including a first member and a second member configured to be moved between an open position and a closed position and the attachment member further including a seal providing for the testing chamber to be airtight when the first and second members are in the closed position. A second fluid section includes a second fluid line with the second fluid section having a fluid volume that is within 15 cc of the first fluid section. Valves are connected to the first fluid line and the second fluid line with the valves adjustable between a first position to allow fluid flow and a second position to prevent fluid flow. A pressure sensor is connected to each of the first and second fluid lines to sense a difference in fluid pressure between the first fluid section and the second fluid section.

In one aspect, the second fluid section further includes a reference chamber connected to the second fluid line.

In one aspect, the seal includes an inner seal positioned in closer proximity to the conduit and an outer seal positioned farther away from the conduit with the inner and outer seals being spaced apart by a gap.

In one aspect, the system includes a seal test section connected to the first fluid line with the seal test section including a first branch line that extends into the testing chamber, a second branch line that extends into the gap formed between the inner and outer seals, and a selection valve adjustable between a first position to open the first branch line to the first fluid line and close a second branch line from the first fluid line and a second position to close the first branch from the first fluid line and open the second branch line to the first fluid line.

In one aspect, the attachment member includes a first port that extends into the testing chamber with the first branch line being connected to the first port and a second port that extends into the gap formed between the inner and outer seals with the second branch line being connected to the second port.

One aspect is directed to a method of leak testing a non-pressurized conduit that includes securing an attachment member to the conduit with a testing chamber forming an airtight seal around the conduit and the testing chamber being part of a first fluid section. The method includes isolating each of the first fluid section and a second fluid section from a fluid movement device. The method includes equalizing a fluid pressure within the first fluid section and a second fluid section with the fluid pressure being different than an ambient pressure and with the first and second fluid sections being in communication. The method includes isolating the first fluid section and the second fluid section from each other after equalizing the fluid pressure and preventing the fluid from flowing between the first and second fluid sections. The method includes after isolating the first fluid section and the second fluid section, sensing a difference in the fluid pressure over time between the first fluid section and the second fluid section. The method includes detecting a leak in the conduit based on the time and a sensed difference in the fluid pressure between the first fluid section and the second fluid section.

In one aspect, securing the attachment member to the conduit includes closing together first and second members of the attachment member from opposing sides of the conduit.

In one aspect, the method includes compressing a seal that includes inner and outer seals that are attached to one of the first and second members with each of the inner and outer seals extending around the testing chamber and preventing the fluid from leaking from the testing chamber.

In one aspect, isolating the first fluid section and the second fluid section includes closing a valve along a shared fluid line.

In one aspect, the method includes determining an exterior size of the conduit, and while the conduit is non-pressurized, forming the attachment member with the testing chamber with rapid prototyping.

In one aspect, the method includes detecting whether there is a leak in an inner seal of the testing chamber by sensing a fluid pressure within a gap formed between the inner seal and an outer seal and sensing the fluid pressure between the first fluid section and the second fluid section.

The features, functions and advantages that have been discussed can be achieved independently in various aspects or may be combined in yet other aspects further details of which can be seen with reference to the following description and the drawings.

DETAILED DESCRIPTION

Figure 1:
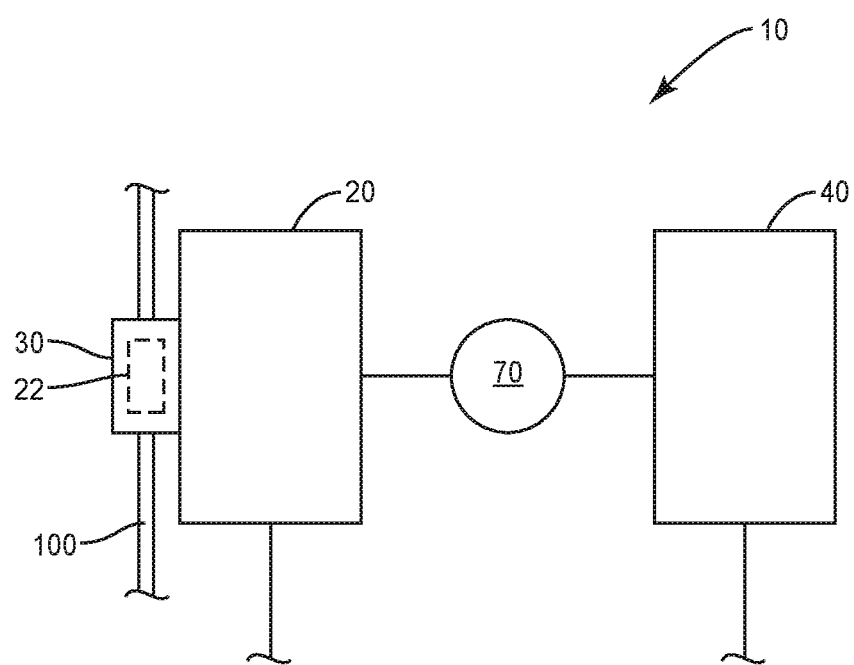
FIG. 1 is a schematic diagram of a leak detection system attached to a conduit.

The present application is directed to a leak detection system configured to be attached on an exterior of a conduit to detect a leak. FIG. 1 includes a schematic view of a leak detection system 10 that detects a leak in a non-pressurized conduit 100. The leak detection system 10 includes a first fluid section 20 and a second fluid section 40 that each includes the same or nearly the same fluid volume. The first fluid section 20 includes a first fluid line 21 and an attachment member 30 with a testing chamber 22 that attaches to the conduit 100. The second fluid section 40 includes at least a second fluid line 41. The fluid volume of the first and second fluid sections 20, 40 is equal or about equal. A pressure sensor 70 connected to each of the first and second fluid sections 20, 40 senses a difference in the fluid pressure between the first and second fluid sections 20, 40 to detect a leak.

Figure 2:
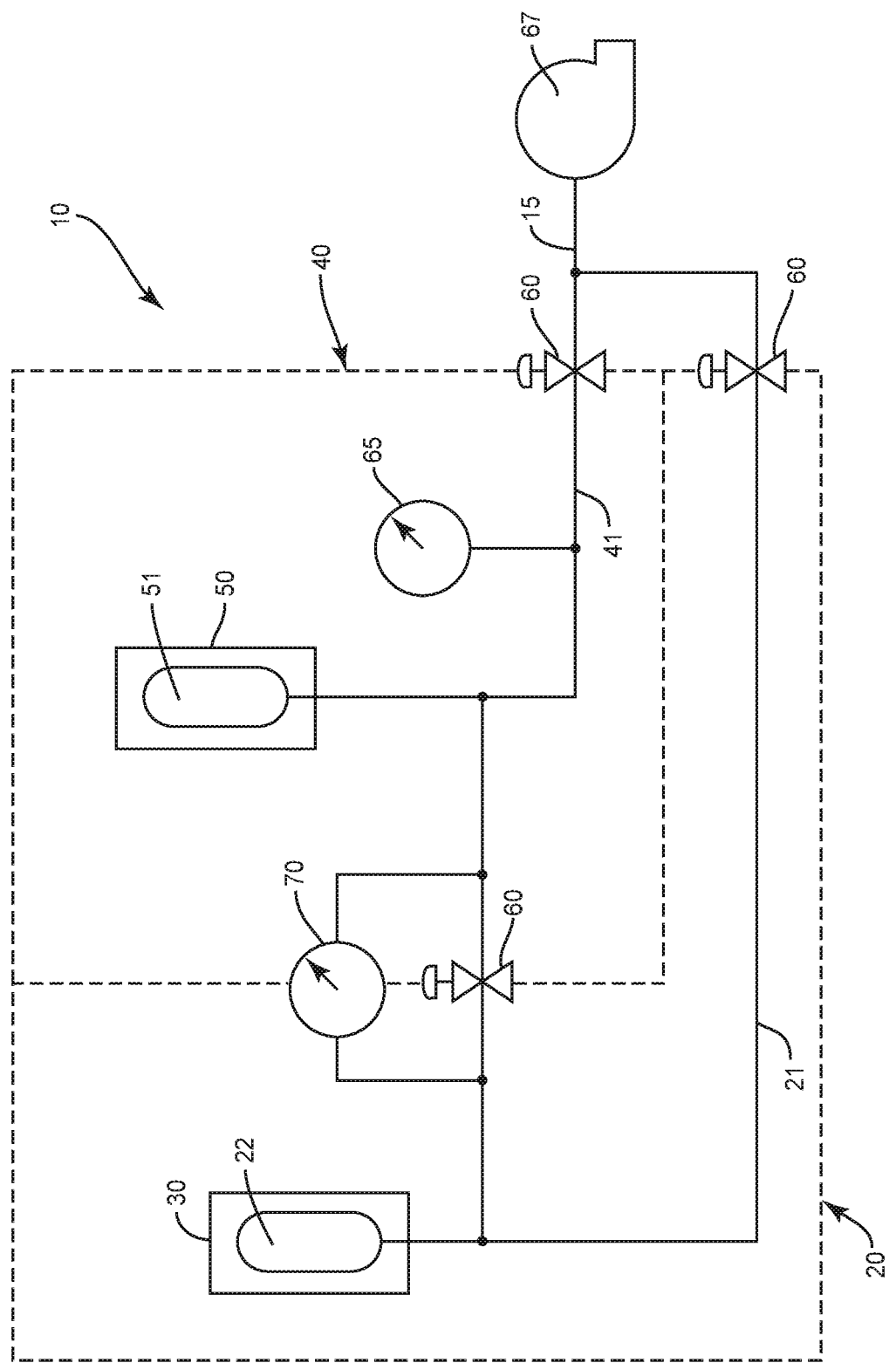
FIG. 2 is a schematic diagram of a leak detection system.

FIG. 2 illustrates a schematic view of a leak detection system 10 that includes first and second fluid sections 20, 40. The first fluid section 20 includes a first fluid line 21 that is in fluid communication with a testing chamber 22 formed within an attachment member 30. The second fluid section 40 includes a fluid line 41 that is in fluid communication with a reference chamber 51. The reference chamber 51 is formed within a reference member 50. The fluid volume of the first fluid section 20 including the first fluid line 21 and the testing chamber 22 is equal to or about equal to the fluid volume of the second fluid section 40 including the second fluid line 41 and the reference chamber 51. In one design, the fluid volumes between the first and second fluid sections 20, 40 are within 15 cc.

A valve 60 is connected to each of the first and second fluid lines 21, 41. The valve 60 is adjustable between an open position for fluid to flow between the first and second fluid lines 21, 41, and a closed position that prevents the flow of fluid between the first and second fluid lines 21, 41. A pressure sensor 70 is also connected to each of the first and second fluid line 21, 41 on each side of the isolation valve 60. The pressure sensor 70 is configured to detect a difference in the fluid pressure between the first and second fluid lines 21, 41. In one design the pressure sensor 70 has a full scale range of 0.2 inches of water and a 0.5% accuracy.

A pressure sensor 65 is also positioned along the second fluid line 41 away from the reference chamber 51. The pressure sensor 65 detects the fluid pressure along the second fluid line 41. The pressure sensor 65 can also be positioned along the first fluid line 21.

A fluid movement device 67 is connected via a supply line 15 to each of the first and second fluid lines 20, 40. The fluid movement device 67 creates a pressure or vacuum within the first and second fluid lines 20, 40. The fluid movement device 67 can be a vacuum source and reduce the fluid pressure within first and second fluid lines 21, 41 below an ambient pressure. The fluid movement device 67 can also be a fluid source to increase the fluid pressure within the first and second fluid lines 21, 41 to above an ambient pressure. Valves 60 are positioned along each of the first and second fluid lines 21, 41 to isolate the first and second fluid sections 20, 40 from the fluid movement device 67.

The attachment member 30 is configured to be attached to the conduit 100. The attachment member 30 includes an airtight testing chamber 22 that is positioned around the tested portion of the conduit 100. The attachment member 30 can be constructed from one or more pieces that are configured to be attached to the conduit 100 and form the airtight testing chamber 22. On multi-piece designs, the different pieces can be positioned around the conduit 100 from opposing sides and connected together. The separate pieces can be connected together with a hinge and movable between open and closed positions, or can be separate pieces that mate together and are secured by one or more fasteners.

Figure 3:
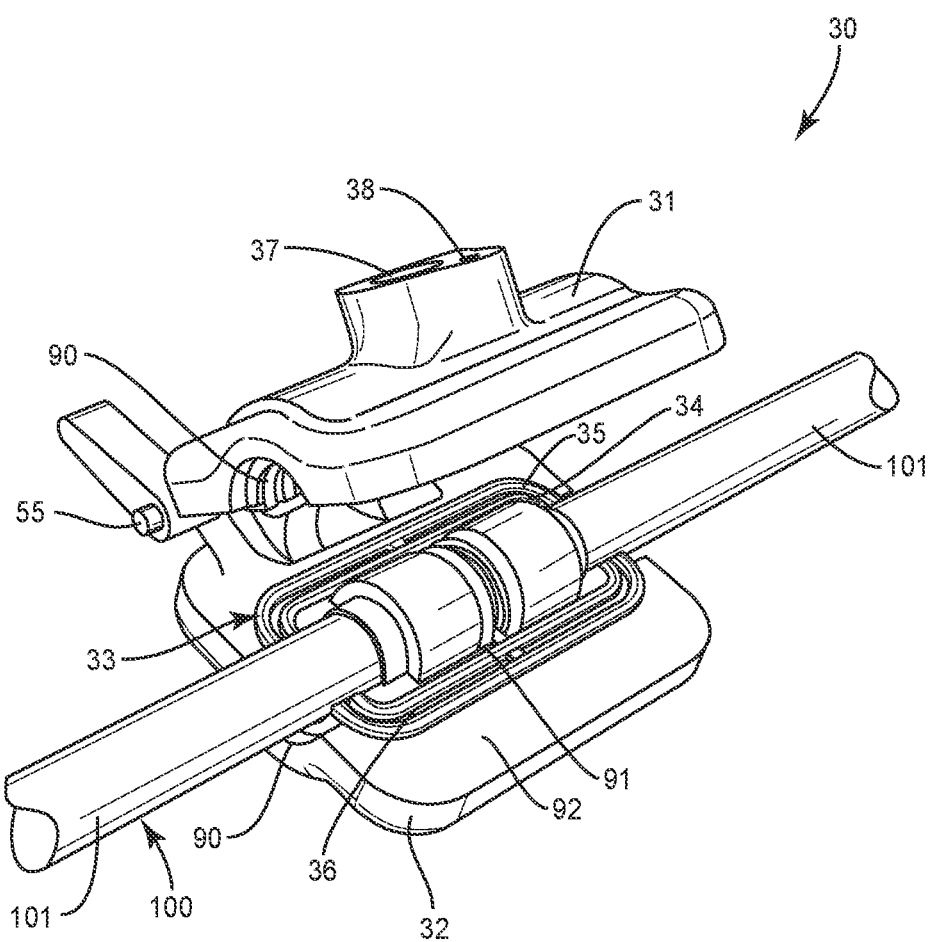
FIG. 3 is a perspective view of an attachment member in an open position located relative to a conduit.

FIG. 3 illustrates an attachment member 30 configured to be attached to the conduit 100. The attachment member 30 includes a first member 31 and a second member 32 that are connected together at a hinge 55. The attachment member 30 is movable to an open position as illustrated in FIG. 3 with the first and second members 31, 32 being apart for positioning the first and second members 31, 32 on opposing sides of the conduit 100. The attachment member 30 is movable to a closed position with the first and second members 31, 32 overlapping and forming the airtight testing chamber 22 around the conduit 100. The attachment member 30 can be constructed from a variety of materials, including but not limited to plastic and metal. In one design, the attachment member 30 is constructed by rapid prototyping using a 3-D printer that is at the location of the conduit 100.

Figure 4:
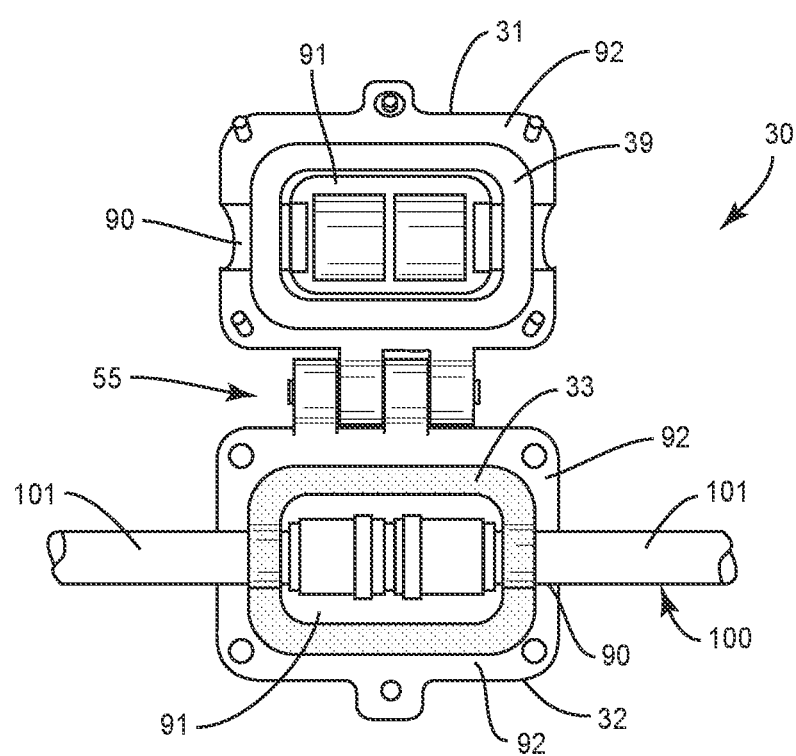
FIG. 4 is a top view of an attachment member in an open position located relative to a conduit.

As illustrated in FIGS. 3 and 4, each of the first and second members 31, 32 comprises a concave channel section 90 that extends into an inner face 92. The channel sections 90 extend across the length of the first and second members 31, 32. Each of the first and second members 31, 32 also includes a concave chamber section 91 that extends into the inner face 92 a greater (i.e., deeper) distance. When the attachment member 30 is in the closed position, the channel sections 90 align together and form a channel that receives the conduit 100. The chamber sections 91 also align together and form the testing chamber 22.

The leak detection system 10 is configured to detect a leak in a variety of different conduits 100. In FIG. 3, the conduit 100 comprises a pipe fitting formed by two pipes 101. The conduit 100 can also include other configurations, including a single pipe. The channel sections 90 and/or chamber sections 91 can be shaped and sized to accommodate the particular conduit 100 to be tested.

FIG. 3 includes an attachment member 30 with a clamshell design with the first and second members 31, 32 attached at the hinge 55. The attachment member 30 can also include separate first and second members 31, 32 (i.e., no hinge 55) that can be attached together to extend around the conduit 100. The first and second members 31, 32 can be secured together by one or more fasteners.

A seal 33 extends around the testing chamber 22 to prevent fluid escape. The seal 33 can be constructed to be deformed by the attachment member 30 in the closed position. The seal 33 can be attached to just one of the first and second members 31, 32 and with the opposing one including a contact surface 39 that contacts against and compresses the seal 33 in the closed position. The seal 33 can also include different sections that are each attached to one of the different first and second members 31, 32. The seal 33 can be constructed from a variety of materials, including but not limited to elastomers.

In one design, the seal 33 is secured to the attachment member 30 using tape. This configuration provides for a larger area to seal, provides for the flow properties to better conform around defects in the surface of the conduit 100 when the attachment member 30 is in the closed position, and the adhesive that is part of the sealant tape helps to provide a better seal. Other designs include an adhesive to secure the seal 33.

FIG. 3 includes a seal 33 with an inner seal 34 and an outer seal 35. The inner and outer seals 34, 35 are each attached to the second member 32 with the first member 31 including a contact surface (not illustrated) that contacts against and compresses the inner and outer seals 34, 35 in the closed position. Each of the inner and outer seals 34, 35 extends around the chamber section 91. The inner and outer seals 34, 35 can also extend across the channel sections 90 and are contacted and compressed by the conduit 100 when the attachment member 30 is in the closed position. A gap 36 is formed between the inner and outer seals 34, 35. The gap 36 includes a width measured between the inner and outer seals 34, 35. The width can be the same around the testing chamber 22, or can vary at one or more different sections.

A port 37 extends through the first member 31 and into the chamber section 91 (and the testing chamber 22 when the attachment member 30 is in the closed position). The port 37 is connected to the first fluid line 21 to move the fluid relative to the testing chamber 22 during the leak testing. A second port 38 extends through the first member 31 and into the gap 36 formed between the inner and outer seals 34, 35. The second port 38 provides for testing the inner seal 34 as will be disclosed below. FIG. 3 includes the ports 37, 38 extending through the first member 31 and inside the seal 33 attached to the second member 32. The ports 37, 38 can extend through either of the first and second member 31, 32, and the seal 33 can be attached to either or both of the first and second members 31, 32.

FIG. 4 illustrates another seal 33 that includes a single unitary body. The seal 33 extends around the chamber section 91 (and the testing chamber 22 in the closed position). The seal 33 includes a width measured between inner and outer edges. The width can be constant around the testing chamber 22, or can vary. FIG. 4 includes the seal 33 attached to the second member 32. The seal 33 can also be attached to the first member 31, or both the first and second members 31, 32.

The fluid volume of the first fluid section 20 is equal or about equal to the fluid volume of the second fluid section 40. This provides for testing the differential pressure between the first and second fluid sections 20, 40 to detect a leak in the conduit 100. The first fluid section 20 can include the first fluid line 21 and the testing chamber 22. The second fluid section 40 can include the second fluid line 41 and the reference chamber 51. In one design, the two fluid volumes are within 15 cc of each other.

The fluid volumes of the testing chamber 22 and the reference chamber 51 can be the same or different. The size can be made as small as possible to facilitate detection of a leak. One design includes each of the fluid volumes being less than or equal to 15 cc. Another design includes each of the fluid volumes being equal.

Figure 5:
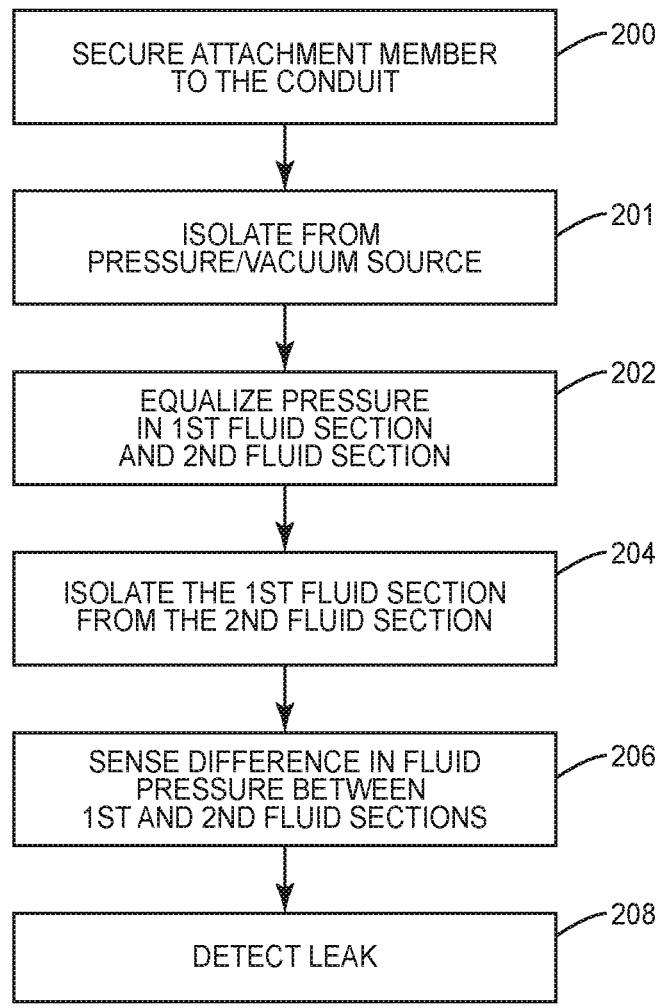
FIG. 5 is a flowchart diagram of a method of detecting a leak in a conduit.

FIG. 5 illustrates a method of leak testing a conduit 100. The attachment member 30 is secured to the conduit 100 with the testing chamber 22 forming an airtight seal around the conduit 100 (block 200). Prior to performing the test, the conduit 100 can be locally cleared of fluid such that air is within the conduit 100 and depressurized.

Once the attachment member 30 is secured, the desired pressure is obtained in the first and second fluid sections 20, 40. This pressure is different than the ambient pressure. As illustrated in FIG. 2, this can include opening the valves 60 and moving fluid with the fluid movement device 67 along the first and second fluid sections 20, 40. This can include the fluid movement device 67 being a vacuum and reducing the fluid pressure below ambient. This can also include the fluid movement device 67 being a pressure source and increasing the fluid pressure above ambient. The pressure sensor 65 can be used during the process to sense the fluid pressure within the second fluid section 40. Once the desired fluid pressure is achieved, the valves 60 at the fluid movement device 67 can be closed to isolate the first and second fluid sections 20, 40 (block 201). The fluid movement device 67 can also be deactivated.

The fluid pressure within the first and second fluid sections 20, 40 is equalized (block 202). This includes keeping the valve 60 between the first and second fluid sections 20, 40 open such that the pressure can equalize within the first and second fluid sections 20, 40. Once equalized, the first fluid section 20 is isolated from the second fluid section 40 (block 204). This can include closing the valve 60 thus preventing the fluid from flowing between the first and second fluid sections 20, 40.

The pressure sensor 70 that is operatively connected to each of the first and second fluid sections 20, 40 can sense a difference in the fluid pressure over time between the first and second fluid sections 20, 40 (block 206). The accuracy of the leak measurement can be a function of both the difference in pressure and the amount of time allowed for pressure or vacuum delay. A leak is detected when the sensor 70 senses a difference in the fluid pressure between the first and second fluid sections 20, 40 (block 208). The leak can be detected when the difference in fluid pressures is above a predetermined amount within a given period of time. The leak can also be detected when there is any difference in the fluid pressures over a period of time.

The testing chamber 22 is sized to closely match the size of the conduit 100. This minimizes an amount of fluid that is within the testing chamber 22. Designs include less than 10 cc of fluid being in the testing chamber 22 when extending around the conduit 100. Other designs include the testing chamber 22 sized to hold less than 30 cc of fluid. The small volume of the testing chamber 22 provides for a relatively small leak to proportionally be substantial relative to the testing chamber 22. This provides for the leak detection system 10 to be accurate to detect small leaks in relatively short periods of time. The leak detection system 10 can detect leaks as small as E-04 to E-06 cc/sec.

Figure 6:
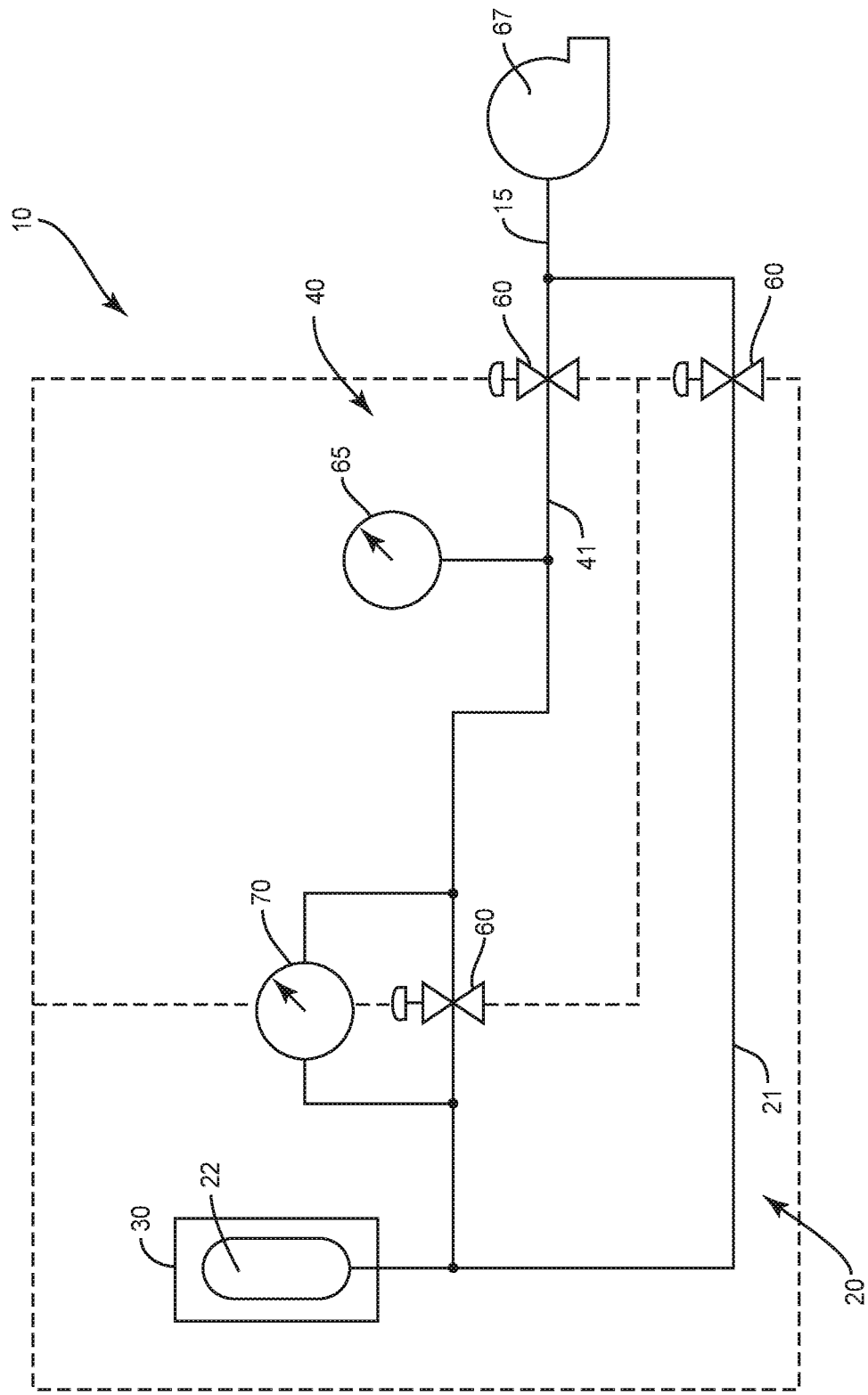
FIG. 6 is a schematic diagram of a leak detection system.

As illustrated in FIG. 2, the first and second fluid sections 20, 40 include equal or about equal fluid volumes. The first fluid section 20 includes the fluid line 21 and the testing chamber 22. The second fluid section 40 includes the fluid line 41 and the reference chamber 51. FIG. 6 includes a leak detection system 10 that does not include the reference chamber 51. That is, the fluid volume of the fluid line 41 is equal to or about equal to the fluid line 21 plus the testing chamber 22. The fluid volume of the fluid line 41 is such that is it equal to or about equal to the fluid volume of the first fluid section 20.

Figure 7:
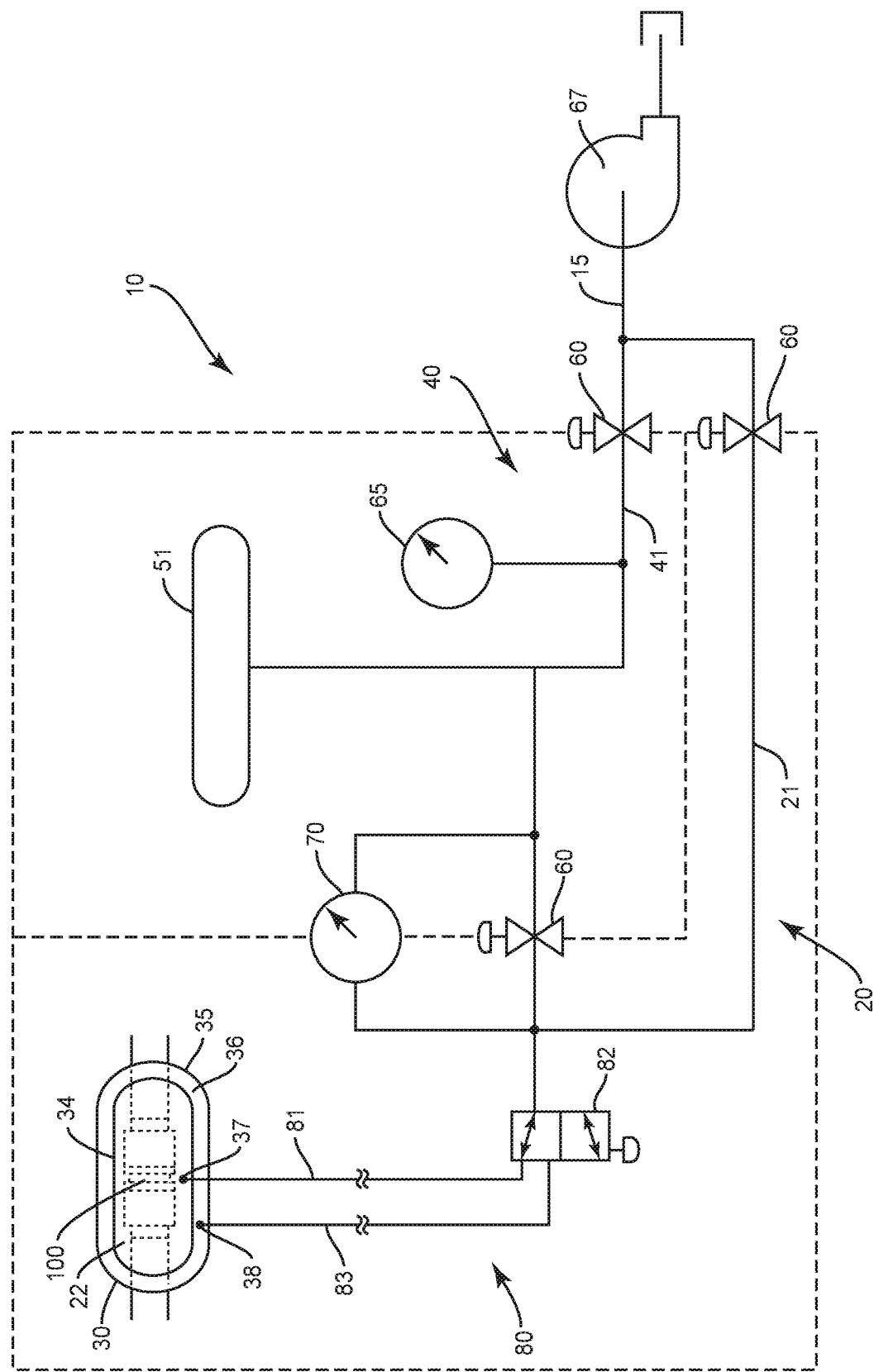
FIG. 7 is a schematic diagram of a leak detection system also configured to detect a leak in a seal of an attachment member.

Prior to detecting a leak in the conduit 100, it can be necessary to test that the seal 33 is airtight. FIG. 7 illustrates a leak detection system 10 that provides for this testing. The first fluid section 20 includes a seal test section 80. The seal test section 80 includes a first branch line 81 that is in communication with the port 37 in the testing chamber 22. A second branch line 83 is in communication with the seal check test port 38 of the attachment member 30. A selection valve 82 is selectively positioned between a first position for the first branch line 81 to be in fluid communication with the first fluid line 21 (and a second branch line 83 being closed), and a second position for the second branch line 83 to be in fluid communication with the first fluid line 21 (and the first branch line 81 being closed).

As in the leak detection system 10 of FIGS. 2 and 6, the fluid volume is the same or about the same in the first and second fluid sections 20, 40. Further, the two sections of the seal test section 80 include the same fluid volume. That is, the volume of the first branch line 81 and the testing chamber 22 is equal to the volume of the branch line 83 and the gap 36. Thus, the first section 20 has the same volume when the valve 82 is in either the first or section position. This provides for testing of the inner seal 34 in a similar manner as testing for a leak as described above.

During testing of the inner seal 34, the selection valve 82 is in the second position. The fluid pressure is equalized within the first fluid section 20 (that includes the branch line 83 and gap 36) and the second fluid section 40. This pressure is different than the ambient pressure. Once the desired fluid pressure is achieved, the valves 60 at the supply line 15 are closed to prevent additional fluid movement along the first and second fluid lines 21, 41 and the fluid movement device 67 can be deactivated.

The fluid pressure within the first and second fluid sections 20, 40 is allowed to equalize. Once equalized, the first fluid section 20 is isolated from the second fluid section 40 by closing the valve 60 that separates the two thus preventing the fluid from flowing between the first and second fluid sections 20, 40.

The pressure sensor 70 that is operatively connected to each of the first and second fluid sections 20, 40 can sense a difference in the fluid pressure. A leak is detected when the sensor 70 senses a difference in the fluid pressure between the first and second fluid sections 20, 40. This can include any difference in fluid pressure over a time, or a difference above a predetermined amount over a given time.

During testing of the conduit 100, the selection valve 82 is in the first position. The testing of the conduit 100 using the testing chamber 22 is performed as explained above with reference to FIG. 5. In the various positions of the selection valve 82, the opposing branch line 81, 83 that is not active is closed.

Figure 8:
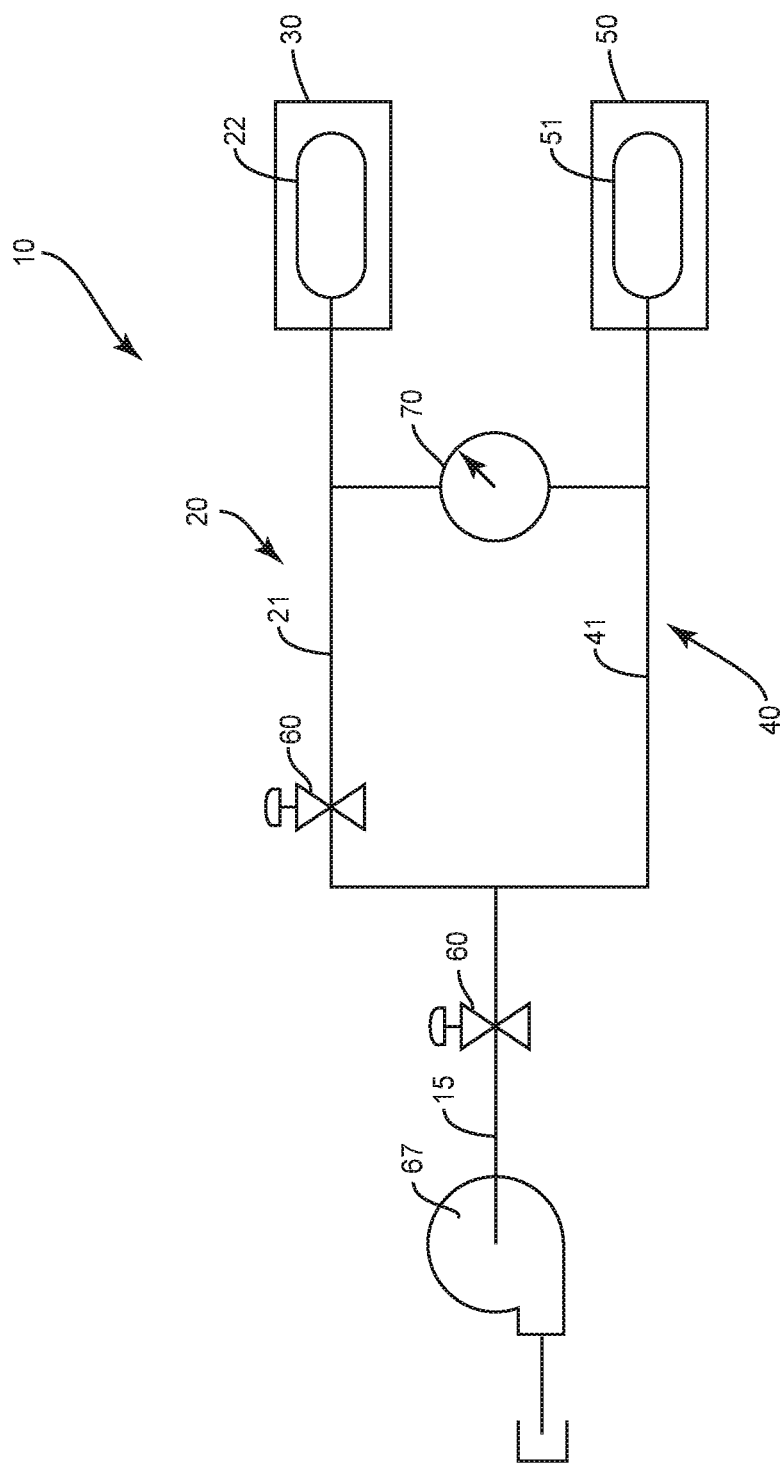
FIG. 8 is a schematic diagram of a leak detection system.

The leak detection system 10 can include valves 60 positioned at different locations along the first and second fluid sections 20, 40. FIG. 8 illustrates a valve 60 positioned along the supply line 15 leading into the first and second fluid lines 21, 41. This valve 60 can isolate the first and second fluid sections 20, 40 from the fluid movement device 67. A second valve 60 isolates the first and second fluid sections 20, 40 and can be positioned at different points along the first and second fluid lines 21, 41. FIG. 8 specifically includes the second valve 60 positioned along the first fluid line 21.

Figure 9:
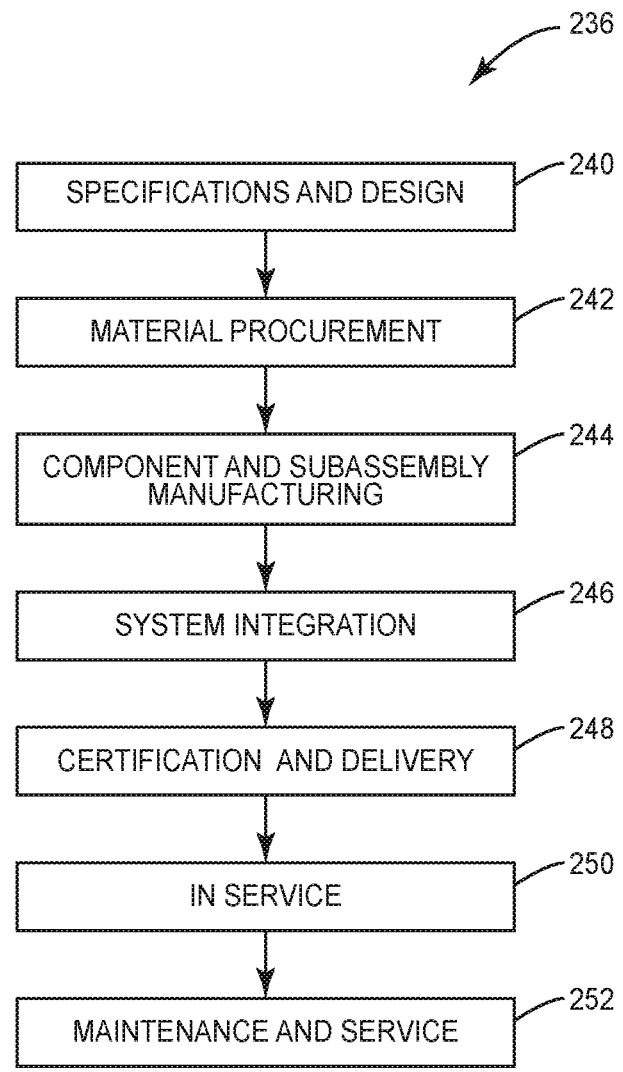
FIG. 9 is a flow diagram of a vehicle production and service methodology.
Figure 10:
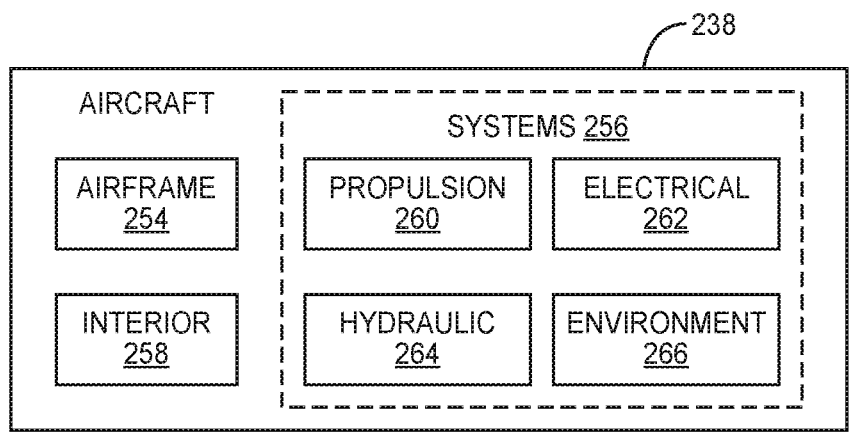
FIG. 10 is a block diagram of a vehicle.

The leak detection system 10 can be used in a variety of potential applications, particularly in the transportation industry, including for example, aerospace, marine, automotive applications and other application where automated layup equipment can be used. The leak detection system 10 can be used in the context of a vehicle manufacturing and service method 236 as illustrated in FIG. 9 and a vehicle 238 such as an aircraft as illustrated in FIG. 10. During preproduction, exemplary methods 236 can include specification and design 240 of the vehicle 238 and material procurement 242. During production, component and subassembly manufacturing 244 and system integration 246 of the vehicle 238 takes place. Thereafter, the vehicle 238 can go through certification and delivery 248 in order to be placed in service 250. While in service by a customer, the vehicle 238 is scheduled for routine maintenance and service 252, which can also include modification, reconfiguration, refurbishment, and so on.

The processes of method 236 can be performed or carried out by a system integrator, a third party, and/or an operator (e.g., a customer). For the purposes of this description, a system integrator can include without limitation any number of vehicle manufacturers and major-system subcontractors; a third party can include without limitation any number of vendors, subcontractors, and suppliers; and an operator can be an airline, leasing company, military entity, service organization, and so on.

As shown in FIG. 10, the vehicle 238 produced by exemplary method 236 can include an airframe 254 with a plurality of systems 256 and an interior 258. Examples of high-level systems 256 include one or more of a propulsion system 260, an electrical system 262, a hydraulic system 264, and an environmental system 266. Any number of other systems can be included. Although an aerospace example is shown, the principles of the disclosure can be applied to other industries, such as the marine and automotive industries.

Systems and methods embodied herein can be employed during any one or more of the stages of the production and service method 236. For example, components or subassemblies corresponding to component and subassembly manufacturing 244 can be fabricated or manufactured in a manner similar to components or subassemblies produced while the vehicle 238 is in service. Also, one or more apparatus embodiments, method embodiments, or a combination thereof can be utilized during the component and subassembly manufacturing 244 and system integration 246, for example, by expediting assembly of or reducing the cost of a vehicle 238. Similarly, one or more of apparatus embodiments, method embodiments, or a combination thereof can be utilized while the vehicle 238 is in service, for example and without limitation, to maintenance and service 252.

The leak detection system 10 can be used with a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A leak detection system to test a non-pressurized conduit, the leak detection system comprising:
    a first fluid line;
    a second fluid line connected to the first fluid line;
    a testing chamber connected to the first fluid line, the testing chamber sized to extend around the conduit;
    valves connected to the first fluid line and the second fluid line, the valves adjustable between open and closed positions to control fluid entering and exiting the first fluid line and the second fluid line and to control a flow of the fluid between the first and second fluid lines; and
    a pressure sensor connected to each of the first and second fluid lines to sense a difference in fluid pressure between the first fluid line and the second fluid line.

2. The system of claim 1, wherein a first fluid volume of the first fluid line in combination with the testing chamber is within 15 cc of a second fluid volume of the second fluid line.

3. The system of claim 1, further comprising a reference chamber connected to the second fluid line, a first fluid volume of the first fluid line in combination with the testing chamber is within 15 cc of a second fluid volume of the second fluid line in combination with the reference chamber.

4. The system of claim 1, wherein the testing chamber is formed by a first member and a separate second member that are configured to be connected together, and wherein at least one of the first member and the second member includes a seal for the testing chamber to be airtight when the first and second members are in a closed position.

5. The system of claim 4, wherein each of the first and second members comprise a concave channel that extends into an inner face and a concave chamber section positioned along the channel, the channels of the first and second members being aligned together in the closed position.

6. The system of claim 1, further comprising a seal that extends around the testing chamber to prevent fluid from leaking from the testing chamber, the seal comprises an inner seal positioned in closer proximity to the conduit and an outer seal positioned farther away from the conduit, the inner and outer seals being spaced apart by a gap.

7. The system of claim 6, wherein the first fluid line comprises a first branch line that extends into the testing chamber and a second branch line that extends into the gap formed between the inner and outer seals.

8. The system of claim 7, further comprising a selection valve positioned on the first fluid line, the selection valve being adjustable between a first position for fluid to flow along the first branch line and prevent fluid to flow along the second branch line, and a second position for fluid to flow along the second branch line and prevent fluid to flow along the first branch line.

9. The system of claim 1, wherein one of the valves is positioned on one of the first fluid lines or the second fluid lines, and a second one of the valves is positioned on a feeder line that leads to each of the first fluid line and the second fluid line.

10. A leak detection system to test a non-pressurized conduit, the leak detection system comprising:
    a first fluid section comprising:
        a first fluid line;
        an attachment member comprising a testing chamber connected to the first fluid line, the attachment member comprising a first member and a second member configured to be moved between an open position and a closed position, the attachment member further comprising a seal providing for the testing chamber to be airtight when the first and second members are in the closed position;
    a second fluid section comprising a second fluid line;
    valves connected to the first fluid line and the second fluid line, the valves adjustable between a first position to allow fluid flow and a second position to prevent fluid flow; and a pressure sensor connected to each of the first and second fluid lines to sense a difference in fluid pressure between the first fluid section and the second fluid section.

11. The system of claim 10, wherein the second fluid section further comprises a reference chamber connected to the second fluid line.

12. The system of claim 10, wherein the seal comprises an inner seal positioned in closer proximity to the conduit and an outer seal positioned farther away from the conduit, the inner and outer seals being spaced apart by a gap.

13. The system of claim 12, further comprising a seal test section connected to the first fluid line, the seal test section comprising:
- a first branch line that extends into the testing chamber;
- a second branch line that extends into the gap formed between the inner and outer seals; and
- a selection valve adjustable between a first position to open the first branch line to the first fluid line and close a second branch line from the first fluid line and a second position to close the first branch line from the first fluid line and open the second branch line to the first fluid line.

14. The system of claim 13, wherein the attachment member comprises a first port that extends into the testing chamber with the first branch line being connected to the first port and a second port that extends into the gap formed between the inner and outer seals with the second branch line being connected to the second port.

15. A method of leak testing a non-pressurized conduit, the method comprising:
- securing an attachment member to the conduit with a testing chamber forming an airtight seal around the conduit, the testing chamber being part of a first fluid section;
- isolating each of the first fluid section and a second fluid section from a fluid movement device;
- equalizing a fluid pressure within the first fluid section and the second fluid section with the fluid pressure being different than an ambient pressure, the first and second fluid sections being in communication;
- isolating the first fluid section and the second fluid section from each other after equalizing the fluid pressure and preventing the fluid from flowing between the first and second fluid sections;
- after isolating the first fluid section and the second fluid section, sensing a difference in the fluid pressure over time between the first fluid section and the second fluid section; and
- detecting a leak in the conduit based on a sensed difference over time in the fluid pressure between the first fluid section and the second fluid section.

16. The method of claim 15, wherein securing the attachment member to the conduit comprises closing together first and second members of the attachment member from opposing sides of the conduit.

17. The method of claim 16, further comprising compressing a seal that includes inner and outer seals that are attached to one of the first and second members, each of the inner and outer seals extending around the testing chamber and preventing the fluid from leaking from the testing chamber.

18. The method of claim 15, wherein isolating the first fluid section and the second fluid section comprises closing a valve along a shared fluid line.

19. The method of claim 15, further comprising:
- determining an exterior size of the conduit; and
- while the conduit is non-pressurized, forming the attachment member with the testing chamber with rapid prototyping.

20. The method of claim 15, further comprising detecting whether there is a leak in an inner seal of the testing chamber by sensing a fluid pressure within a gap formed between the inner seal and an outer seal and sensing the fluid pressure between the first fluid section and the second fluid section.

* * * * *